May 4, 1948.    J. M. PATTERSON    2,440,696
WELDING MECHANISM
Filed Sept. 13, 1944        2 Sheets-Sheet 1

INVENTOR:
JAMES M. PATTERSON
By John D. Rippey
HIS ATTORNEY.

May 4, 1948.　　　　J. M. PATTERSON　　　　2,440,696
WELDING MECHANISM
Filed Sept. 13, 1944　　　　2 Sheets-Sheet 2
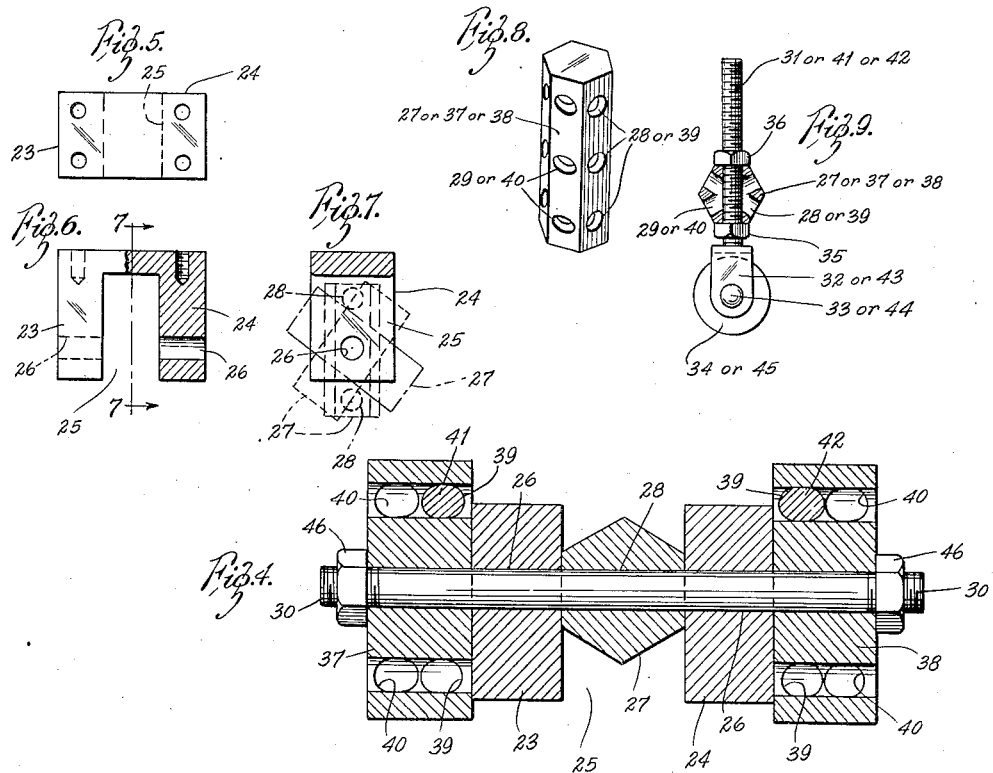
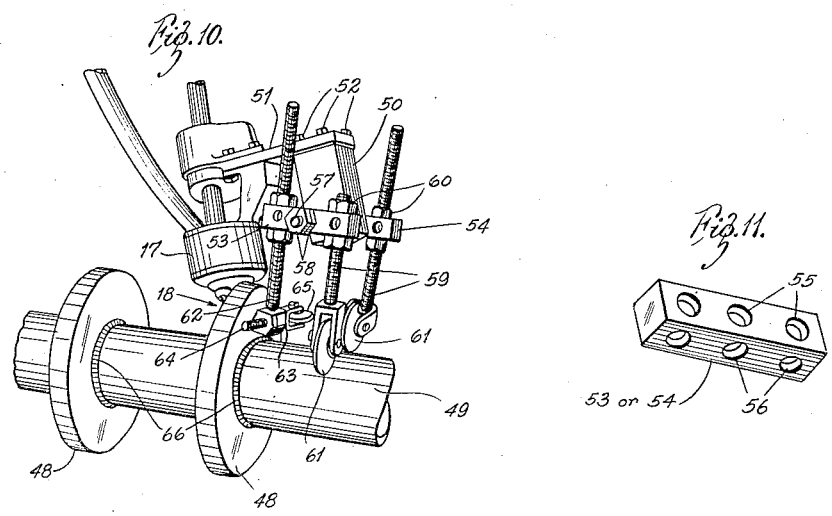
INVENTOR:
JAMES M. PATTERSON,
By John D. Rippey
HIS ATTORNEY.

Patented May 4, 1948

2,440,696

UNITED STATES PATENT OFFICE 2,440,696

WELDING MECHANISM

James M. Patterson, Jennings, Mo., assignor to Central Mine Equipment Co., St. Louis, Mo., a corporation of Missouri Application September 13, 1944, Serial No. 553,822

11 Claims. (Cl. 219—8)

This invention relates to welding mechanisms; and it has special reference to mechanisms for guiding, and for holding the head of a welding machine in proper position relative to rotary articles to be welded together during rotation of said articles.

An object of the invention is to provide mechanism for supporting and rotating an elongated cylindrical element and a spiral flight or rib on and about to be welded to said cylindrical element, in combination with means for supporting a welding machine for longitudinal movements and having a head for effecting welding connection between said cylindrical element and said spiral flight or rib by a welding composition fed to the line of separation between said element and said spiral flight or rib, and a device attached to and supported by a part of the welding machine for engaging said cylindrical element and said spiral flight or rib to hold the welding head in proper relationship thereto automatically and as an incident to rotation of said cylindrical element and said spiral flight or rib.

Another object of the invention is to provide a support for rotating a cylindrical element and a spiral flight or rib to be welded thereto, in combination with means for supporting a welding machine for longitudinal movements and having a head for effecting welding connection between said element and said part, and a series of rotary wheels mounted on the welding machine for engaging said element and said part and holding the welding head of the machine in proper relationship thereto, and also moving the welding machine longitudinally in a plane parallel with the axis of said element automatically and as an incident to rotation of said element and said part.

Another and more general object of the invention is to provide mechanism for supporting and rotating an elongated cylindrical element carrying a circumferential part to be welded to said element, in combination with a welding machine having a head for effecting welding connection between said cylindrical element and said part by a welding composition fed to the line of separation between said element and said part, and a device attached to and supported by a part of the welding machine for engaging said cylindrical element and said part to hold the welding head in proper relationship thereto automatically and as an incident to rotation of said cylindrical element and part.

Other objects and advantages should be apparent from the following description, reference being made to the annexed drawings, in which—

Fig. 4 is an enlarged detail sectional view on the line 4—4 of Fig. 3, showing several adapters for the wheels engaging the cylindrical element and the spiral flight or rib.

Fig. 5 is a top plan view of a bracket constituting a support for said adapters that carry the wheels engaging the rotary cylindrical element and the spiral flight or rib to be welded to said element.

Fig. 6 is a side elevation of said bracket with a part thereof in section.

Fig. 7 is a sectional view of said bracket on the line 7—7 of Fig. 6, showing, in broken lines, adapters in different adjusted positions on said bracket, as indicated by broken lines.

Fig. 8 is a perspective view of one of the adapters for the wheels used in the invention.

Fig. 9 is a cross-sectional view of the adapter shown in Fig. 8, having a wheel connected therewith.

Fig. 10 is a perspective view of a modification of the invention for attaching a circumferential part or annular spacer to an elongated cylindrical tube.

Fig. 11 is a perspective view of one of the adapters used in the modification of Fig. 10.

Figure 1:
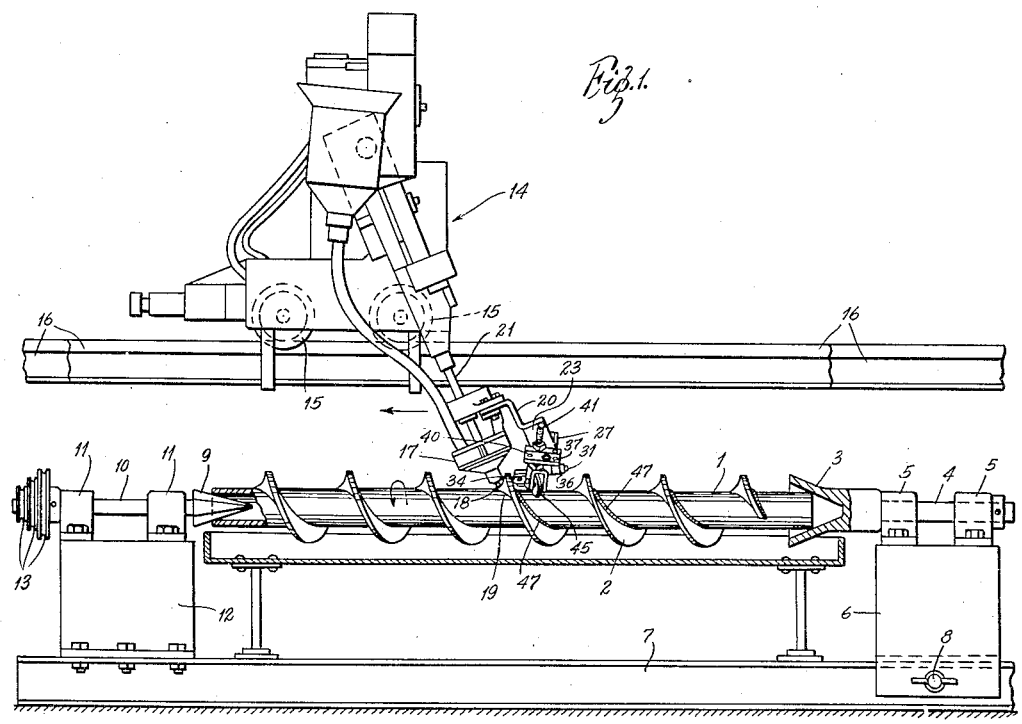
Fig. 1 is a side elevation of a longitudinally movable welding machine and a rotary cylindrical element and spiral flight or rib to be welded together during rotation thereof.
Figure 2:
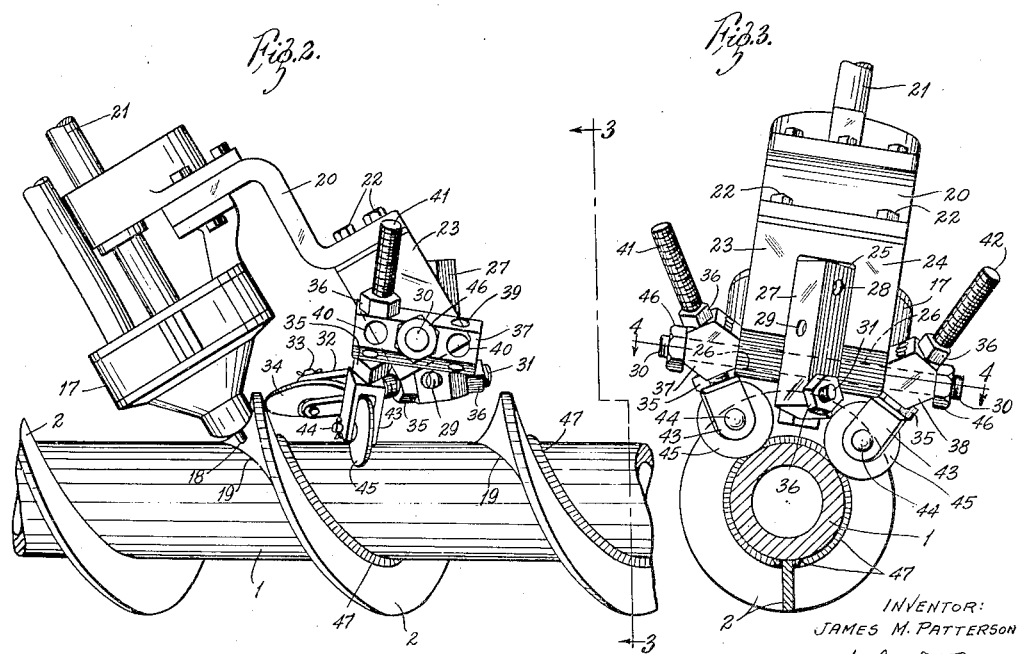
Fig. 2 is an enlarged side elevation showing a portion of the rotary cylindrical element and spiral flight and the device that is supported by the welding machine for engaging said element and said flight and moving the welding machine longitudinally automatically and as an incident to rotation of said element and flight.
Figure 3:
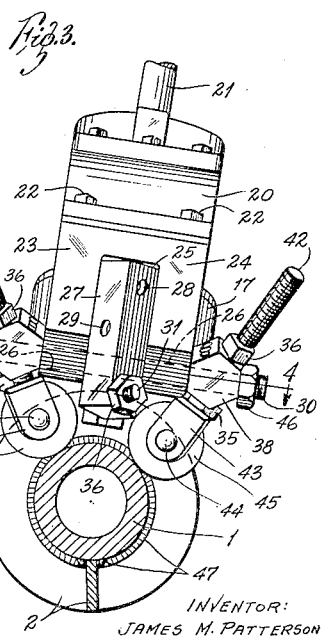
Fig. 3 is a transverse sectional view on the line 3—3 of Fig. 2, showing two wheels engaging the periphery of the cylindrical rotary element at circumferentially spaced points.

As shown in Figs. 1, 2 and 3, the elongated cylindrical element 1 is an auger section of the type disclosed in Benjamin F. Rassieur Patent No. 2,088,759, August 3, 1937. This cylindrical auger section is preferably tubular and supports a sprial flight or spiral rib 2. The auger section 1 and the flight or rib 2 are to be attached together by welding. One end of the auger section 1 is engaged with a rotary chuck 3 having a shaft 4 journalled in bearings 5 attached to a longitudinally adjustable bracket 6. The bracket 6 is movable to different longitudinally adjusted positions along a rigid horizontal support 7 to which said bracket may be attached by familiar clamping devices 8.

The opposite end of the auger section 1 is engaged by a chuck head 9 attached to a shaft 10 in axial alinement with the shaft 4 and journalled for rotation in bearings 11 rigid on a bracket 12 attached to the horizontal support 7. The shaft 10 constitutes a drive shaft for rotating the auger section 1 engaged between and supported by the chuck members 3 and 9. The outer end of the shaft 10 supports a number of pulleys 13 with which a driving belt from a motor (not shown) may be engaged to rotate the chuck device 9—10 and thereby positively rotate the auger section 1 and the spiral flight or rib 2 thereon.

An electric welding machine 14 of known construction is supported for longitudinal movements in a plane parallel with the axis of the auger section 1. As shown, the frame of the welding machine is supported by a truck comprising wheels 15 operating on and along rails 16 rigidly mounted parallel with the axis of an auger section 1 mounted between the chuck elements 3 and 9. Welding composition is fed through a welding head 17 supported and carried by the welding machine 14 and having welding rod electrodes 18 adjacent to the periphery of the auger section 1 near the joint 19 between the auger section 1 and the spiral flight or rib 2 thereon.

Heretofore, in the manufacture of earth augers and mining augers including a rotary auger section 1 and a spiral flight or rib 2, difficulty has been encountered in effecting a welding attachment between said two parts. It has been difficult or impossible to move an electric welding machine longitudinally automatically and as an incident to rotation of the auger section 1, and to produce a welded connection attaching the spiral flight or rib 2 directly to the auger section 1 automatically and as an incident to the rotation of said parts. The present invention provides a satisfactory solution of this difficulty, holds the welding machine and the electrodes 18 of the head 17 in proper position relative to the joint 19 regardless of any irregularities in and along the surface of the auger section 1 and regardless of any irregularities in and along the inner peripheral portions of the spiral flight or rib 2. By this invention, the welding machine is moved in synchronism with the spiral of the flight or rib 2 regardless of any variations in the pitch of said flight or rib.

My invention comprises a support 20 rigidly attached to the shaft 21 and to the head 17 of the electric welding machine. An adapter bracket is detachably and rigidly secured to the support 20 by removable and replaceable fasteners 22. Said bracket comprises two arms 23 and 24 separated by an intervening space 25 and having axially alined holes 26. An elongated adapter 27 having at least two opposite flat sides is removably fitted in the space 25 between the arms 23, 24, and has a number of unscrewthreaded holes 28 and 29 adapted to register with the holes 26 selectively. That is, any selected one of the holes 28 or 29 may be placed in registration with the holes 26 and rigidly secured to the bracket 23—24 by a fastener rod 30 extending through the holes 26 and through the respective holes in the adapter 27 selectively alined with said holes 26. A stud 31 extends through a selected one of the holes 28 and 29 angularly across the plane of the rod 30 and on its lower end supports a bracket 32. An axle 33 is supported by the bracket 32, and a wheel 34 is rotatively mounted on said axle and arranged to operate against the side of the spiral flight or rib 2 opposite from the side along or adjacent to which the electrodes 18 operate. The stud 31 is shown as screwthreaded, and has two nuts 35 and 36 screwed thereon for clampingly engaging opposite sides of the adapter 27 to hold the stud 31 rigidly in any adjusted position on said adapter according to the thickness and according to the pitch of the spiral flight or rib 2. It is evident that the adapter 27 may be secured in any angle of inclination on the rod 30 so as to support the stud 31 at any selected angle of inclination with respect to the axis of the cylindrical auger section 1, or to support said stud 31 parallel with said axis, as desired.

Preferably, two duplicate adapters 37 and 38 having series of unscrewthreaded holes 39 and 40 are mounted on the rod 30 at the outer sides of the bracket arms 23 and 24, respectively. The adapters 37 and 38 may be duplicates of each other and duplicates of the adapter 27 so that said adapters may, if desired, be interchangeably used. The adapters 37 and 38 may be secured in any angles of inclination relative to the adapter 27, and relative to the axis of the cylindrical auger section 1, or parallel with said axis, as desired.

Studs 41 and 42, duplicates of each other and of the stud 31, extend through any selected holes 39 or 40 in the adapters 37 and 38 angularly with respect to the plane of the rod 30. A bracket 43 is connected with one end of each stud 41 and 42 and supports an axle 44 on which a wheel 45 is mounted to operate against circumferentially spaced peripheral portions of the cylindrical auger section 1. The brackets 43, axles 44, and wheels 45 are duplicates of the bracket 32, axle 33, and wheel 34, respectively. The wheels 45 are at opposite sides of the stud 31, leaving the wheel 34 free to operate against the side of the spiral flight or rib 2 while the wheels 45 operate against spaced peripheral portions of the cylindrical auger section 1 at a distance from said flight or rib 2. Clamping nuts 46 screwed on threaded ends of the rod 30 hold the adapters 27, 37 and 38 rigidly located and prevent any accidental or unintended displacement of said adapters. Thus, when said adapters, and the wheels 34 and 45 are properly adjusted, the electrodes 18 will positively be guided and held adjacent to the joint 19 which is between the cylindrical auger section 1 and the spiral flight or rib 2. When the welding composition is fed to the point or line along which a weld is to be formed, and ajacent to the electrically heated electrodes 18 in the usual manner, a smooth and perfect weld 47 will be formed along the line of the joint 19, thereby rigidly and integrally uniting the spiral flight or rib 2 to the cylindrical auger section 1 by said weld. The rotation of the auger section 1 and the spiral flight or rib 2 is at uniform speed, permitting nearly perfect application of the welding composition to form a smooth weld 47.

The assembly of parts carried on support 20 acts as a traveling gauge which follows the flight 2 during rotation and controls the position of the head 17 relative to the flight throughout the progressive welding operation. The fact that wheel 34 engages the flight 2 directly opposite head 17 enables the progressive welding operation to be accomplished uniformly despite variation or non-uniformities in the pitch of the flight as the space between the head and the flight is gauged in immediate adjacence to the locus of welding at each increment of the progressive operation.

In the modification shown in Figs. 10 and 11, annular spacers 48 are attached to an elongated cylindrical element 49 rotated by the chucks 3 and 9 in the same manner that the cylindrical auger section 1 is rotated by said chucks. In this modification of the invention, a bracket 50 is rigidly attached to a support 51 by removable and replaceable fasteners 52, and supports a pair of adapters 53 and 54 in substitution for the adapters 37 and 38 and each having series of unscrewthreaded holes 55 and 56 like and for the same purpose as the holes 39 and 40 in said adapters 37 and 38. The adapters 53 and 54 are adjustably held on the bracket 50 by a clamping device comprising a bolt 57 and nuts 58 screwed on said bolt and engaging said adapters 53 and 54 to prevent accidental and unintentional displacement thereof. A number of studs 59 analogous to the studs 41 and 42 are adjustably mounted in connection with the adapters 53 and 54 and held from displacement by clamping nuts 60. The studs 59 support wheels 61 for operating along and against circumferentially spaced portions of the cylindrical element 49 like the wheels 45. A stud 62 has a bracket 63 on one end adjustably supporting another stud 64 carrying a wheel 65 for operating against the side of the annular spacer 48 opposite from the electrodes 18 of the welding head 17 of the welding machine. Thus, when the cylindrical element 49 and the annular spacer 48 thereon are rotated by the chuck device already described, the electrodes 18 of the welding head 17 will be held in proper position relative to the joint between the cylindrical element 49 and to the annular spacer 48 thereon, along which the weld is to be formed. A perfect weld 66 integrally uniting the annular spacer 48 and the cylindrical element 49 will be formed.

From the foregoing, it should be evident that this invention attains all of its intended objects and purposes in a highly efficient and satisfactory manner. In the first modification of the invention, the welding machine is moved in synchronism with the rotation or movement of the elements to be attached by welds. In both modifications, it is possible to form the welds with much more rapidity and more perfectly than by any other available devices heretofore available. I am aware that the invention may be varied in other particulars than those specifically disclosed without departure from the nature and principle of the invention as defined by the appended claims.

I claim:

1. Welding mechanism comprising a device for supporting and rotating and preventing longitudinal movement of a cylindrical element and a spiral flight on and about and to be welded to said element, in combination with means for supporting a welding machine for longitudinal movements and having a head for effecting welding connection between said cylindrical element and said spiral flight, and a device attached to and supported by a part of said welding machine for engaging said cylindrical element to hold the welding head in proper relationship thereto and controlling movement of the welding machine longitudinally in a plane parallel with the axis of said cylindrical element.

2. Welding mechanism comprising a device for supporting and rotating an elongated cylindrical element and an annular part to be welded to said element, in combination with a movable welding machine having a head for effecting welding connection between said element and said part during movement of said welding machine, and a device attached to and supported by a part of said welding machine for engaging said part adjacent said head to hold the welding head in proper relationship to said element and to said part during rotation of said element and said part during said movement of said welding machine.

3. Welding mechanism comprising means for supporting and rotating a cylindrical element and a spiral flight or rib on and about and to be welded to said element, in combination with means for supporting a welding machine for longitudinal movements and having a head for effecting welding connection between said element and said flight, and a series of rotary wheels mounted on the welding machine for engaging said element and said flight and holding the welding head of said machine in proper relationship to said element and said flight and also moving the welding machine longitudinally in a plane parallel with the axis of said element automatically and as an incident to rotation of said element and said flight.

4. Welding mechanism comprising a device for supporting and rotating an elongated cylindrical element and a spiral flight on and about and to be welded to said element, in combination with means for supporting a welding machine for longitudinal movements and having a head for effecting welding connection between said element and said flight by welding composition delivered thereto, a bracket attached to said welding machine, and a roller supported by said bracket for operating against the side of said flight opposite from said head to thereby move the welding machine longitudinally in a plane parallel with the axis of said element automatically and as an incident to rotation of said element and said flight.

5. Welding mechanism comprising a device for supporting and rotating an elongated cylindrical element and a spiral flight on and about and to be welded to said element, in combination with means for supporting a welding machine for longitudinal movements and having a head for effecting welding connection between said element and said flight by welding composition delivered thereto, a bracket attached to said welding machine, a roller supported by said bracket for operating against the side of said flight opposite from said head to thereby move the welding machine longitudinally in a plane parallel with the axis of said element automatically and as an incident to rotation of said element and said flight, and rollers supported by said bracket for operating against circumferentially spaced portions of said element at a distance from and on the same side of said flight as said first wheel.

6. Welding mechanism comprising a device for supporting and rotating an elongated cylindrical element and a spiral flight on and about and to be welded to said element, in combination with means for supporting a welding machine for longitudinal movements and having a head for effecting welding connection between said element and said flight by welding composition delivered thereto, a bracket attached to said welding machine, a roller supported by said bracket for operating against the side of said flight opposite from said head to thereby move the welding machine longitudinally in a plane parallel with the axis of said element automatically and as an incident to rotation of said element and said flight, and an adapter mounted in said bracket for holding said roller in different adjustments relative to said head.

7. Welding mechanism comprising a device for supporting and rotating an elongated cylindrical element and a spiral flight on and about and to be welded to said element, in combination with means for supporting a welding machine for longitudinal movements and having a head for effecting welding connection between said element and said flight by welding composition delivered thereto, a bracket attached to said welding machine, a roller supported by said bracket for operating against the side of said flight opposite from said head to thereby move the welding machine longitudinally in a plane parallel with the axis of said element automatically and as an incident to rotation of said element and said flight, rollers supported by said bracket for operating against circumferentially spaced portions of said element at a distance from and on the same side of said flight as said first wheel, and adapters supported by said bracket for holding said last named rollers in different adjustments according to the diameter of said cylindrical element.

8. Welding mechanism comprising supporting means, a welding machine mounted for movements in opposite directions on and along said supporting means, chuck elements for supporting and rotating a cylindrical spiral element and a spiral flight on and about and to be welded to said element during movement of said welding machine in one direction along said supporting means, a support attached to said welding machine, a rotary element carried by said support for engaging a side of said flight in immediate adjacence to the locus of welding and thereby controlling movement of said welding machine during rotation of said cylindrical element and said flight, and a head carried by said welding machine for effecting welding connection between said element and said flight during said controlled movement of said welding machine while said cylindrical element and said flight are rotating.

9. In a device of the character described, a welding machine supported for rectilinear movements in opposite directions from and to a starting position, a welding electrode head supported by said welding machine, a support attached to and carried by said welding machine, means for continuously moving an article to be welded by the welding machine, and a rotary element mounted on said support for engaging in immediate adjacence to said head the moving article to be welded and controlling relative movement between said welding machine and said moving article during a welding operation.

10. In a device of the character described, a welding machine mounted for rectilinear movements in opposite directions, devices for supporting and preventing longitudinal movement of parts to be welded together while said parts are rotated about an axis parallel with said movements of said welding machine, a head attached to said welding machine for effecting welding connection between said parts during said movement of said welding machine in one direction, and an element attached to said welding machine for engaging one of said parts that are to be welded together and thereby holding said welding head of said machine in proper relationship to said parts during movement of said machine.

11. In an apparatus for progressively welding the joint between a screw flight and a cylindrical core therewithin, a welding instrument, a traveling gauge fixed relative to said instrument and releasably engageable with the flight, said gauge being adapted to ride upon the flight and fix the position of the welding instrument relative to the flight adjacent the locus of welding, and means for rotating the flight and core together while the welding instrument and assembly of flight and core are free to move axially relative to each other.

JAMES M. PATTERSON.

REFERENCES CITED

The following references are of record in the file of this patent:

UNITED STATES PATENTS

| Number | Name | Date |
| --- | --- | --- |
| 2,068,166 | Dodge | Jan. 19, 1937 |
| 2,039,690 | Trainer | May 5, 1936 |
| 2,357,376 | Baird | Sept. 5, 1944 |